United States Patent [19]
Hotta et al.

[11] Patent Number: 5,586,320
[45] Date of Patent: Dec. 17, 1996

[54] HIGH SPEED SYNCHRONOUS PROCESSING SYSTEM FOR EXECUTING PARALLEL PROCESSING OF PROGRAMS HAVING LOOPS

[75] Inventors: Koh-Ichiro Hotta; Hiroshi Nagakura; Eiji Yamanaka; Hideki Nozaki, all of Kawasaki, Japan

[73] Assignee: Fujitsu Limited, Kawasaki, Japan

[21] Appl. No.: 337,238

[22] Filed: Nov. 4, 1994

Related U.S. Application Data

[63] Continuation of Ser. No. 777,207, Oct. 16, 1991, abandoned.

[30] Foreign Application Priority Data

Oct. 16, 1990 [JP] Japan ................................ 2-277552

[51] Int. Cl.$^6$ ............................ G06F 15/167; G06F 9/46
[52] U.S. Cl. ........................................ 395/800; 395/676
[58] Field of Search ................................ 395/650, 375, 395/550; 364/DIG. 1, DIG. 2

[56] References Cited

U.S. PATENT DOCUMENTS

| | | | |
|---|---|---|---|
| 4,445,197 | 4/1984 | Lorie et al. | 364/DIG. 1 |
| 4,809,169 | 2/1989 | Sfarti et al. | 364/DIG. 1 |
| 5,222,229 | 6/1993 | Fukuda et al. | 364/DIG. 1 |

OTHER PUBLICATIONS

"Principles of Concurrent Programming" by M. Ben–Ari, Prentice/Hall International, Inc. 1982.
Tang et al., "Compiler Techniques for Data Synchronization in Nested Parallel Loops", *Computer Architecture News*, pp. 177–186, Jun, No. 3, 1990.
Midkiff et al., "Compiler Generated Synchronization for DO Loops" *Proceedings of the 1986 International Conference on Parallel Processing* 19, pp. 544–551, Aug., 1986.
Cytron, "Doacross: Beyond Vectorization for Multiprocessors (Extended Abstract)", *Proceedings of the 1986 International Conference on Parallel Processing* 19, pp. 836–844, Aug., 1986.
Communications acm, Dec. 1986, vol. 29, No. 12, "Advanced Compiler Optimizations for Supercomputers", David A. Padua and Michael J. Wolfe, pp. 1184–1201.

*Primary Examiner*—Thomas M. Heckler
*Attorney, Agent, or Firm*—Staas & Halsey

[57] ABSTRACT

A data processing system for executing a parallel processing of programs by a plurality of computers, includes a plurality of parallel processing execution units for dividing a predetermined processing into a plurality of processings and a plurality of computers for executing a parallel processing of the parallel processing execution unit. In addition, a plurality of wait-until procedure units are provided for synchronization therewith between the plurality of computers in the case of executing a parallel processing. One computer assigns a value to a synchronous variable in the course of synchronous processing between the processors, to vary the value of the synchronous variable regularly, and another computer is adapted to suspend operations using a wait-until procedure until a value of a synchronous variable surpasses a predetermined value. Thus, the invention reduces an overhead time of the synchronous processing by effectively executing a parallel processing of programs.

9 Claims, 6 Drawing Sheets

```
(FOR COMPUTER 1 USE)        (FOR COMPUTER 2 USE)
DO 10 I=1,100,2             DO 10 i=2,100,2
  A(I+1)=W(I) ----┐           A(i+1)=W(i)
    ⋮             │             ⋮
  X(I)=A(I)      └---→        X(i)=A(I)
10 CONTINUE                 10 CONTINUE
```

Fig. 1(C)

```
                reset(syn#1)
                post(syn#2)

(FOR COMPUTER 1 USE)        (FOR COMPUTER 2 USE)
DO 10 I=1,100,2             DO 10 i=2,100,2
  A(I+1)=W(I)                 A(i+1)=W(i)
  post(syn#1)                 post(syn#2)
    ⋮                           ⋮
  wait(syn#2)                 wait(syn#1)
  reset(syn#2)                reset(syn#1)
  X(I)=A(I)                   X(i)=A(i)
10 CONTINUE                 10 CONTINUE
```

HIGH SPEED SYNCHRONOUS PROCESSING SYSTEM FOR EXECUTING PARALLEL PROCESSING OF PROGRAMS HAVING LOOPS

This application is a continuation of application Ser. No. 07/777,207, filed Oct. 16, 1991, now abandoned.

BACKGROUND OF THE INVENTION

Field of the Invention

The present invention relates to a high speed synchronous processing system for executing a parallel processing of programs having loops by a plurality of computers.

When a loop in a program is parallel-executed by a plurality of computers, each iteration of the loop is executed by a respective computer. In this case, if an operation performed by the computers is not synchronized, a true or correct execution will often not occur.

For example, the case where a parallel processing of a DO loop described by the FORTRAN programming language is executed often requires synchronization between computers. In general, when a parallel processing of a general purpose program is executed, a parallel processing of a loop can be easily executed.

A parallel (processing) execution image of an original program for a serial or sequential execution is represented or contained in each of the computers performing the parallel processing. The parallel execution image is as follows. That is, each iteration of a loop is executed by every execution unit in the parallel processing, and a processing thereof is parallel-executed by two or more computers. For this reason, when utilizing a parity of loop parameters, the image is divided into procedures by a cyclic distribution mode.

When a parallel processing of a procedure is executed, for example, before an assignment statement assigned into A(I+1) at I=1 in a procedure for a first computer-1 is executed, if a reference of A(I) at I=2 in a procedure for a second computer-2 is made, then an execution result obtained in the parallel processing is different from that of a sequential execution program.

Thus, procedures to effect or permit synchronous processing (e.g., post, wait) are provided between each execution image, to warrant or ensure a correct execution result. Syn #1 and syn #2 are variables used for a synchronous processing, that is synchronous variables, and take three kinds of values, "posted", "waiting" and "cleared". The labels or words (post), (wait), and (reset) denote procedures for utilizing the synchronous variables to effect a synchronous processing. (Wait) denotes a procedure that, if a value of a synchronous variable given as an argument is not "posted", the value of the variable is changed to "waiting" and then the continuation of processing is kept on inactive or suspended until the value is changed to "posted". (Post) denotes a procedure such that the value of a synchronous variable of an argument is reduced or changed to "posted" and the execution of the inactive procedure is restarted. (Reset) denotes a procedure that, when the value of a synchronous variable is equal to "posted", the value is changed to "cleared".

When the procedures are parallel-executed, each procedure of (post), (wait) and (reset) is executed during each iteration of a loop, and the operation of synchronization is carried out at a synchronization point (at a time of the (wait) procedure).

In a conventional method, synchronous variable syn #1 and syn #2 are required to be shared with the two computers. From this method, conversely, the two computers are able to effect or perform a reference operation and a change operation at the same time on each synchronous variable. In this case, the relevant synchronous variables are destructible or may be incorrectly changed and as a result, a true or correct processing is impossible to achieve.

Therefore, it is necessary to carry out indivisibly or separately the processings such as a reference of a synchronous variable, a pause instruction of a procedure and a restart of the procedure. For this reason, a special hardware instruction for synchronous processing (for example, a time-sharing instruction) is utilized.

Nevertheless, it is a characteristic that this kind of instruction has a longer run duration or takes longer to execute than a general instruction. Thus, a frequent overhead occurs due to a great deal (every iteration) of (post), (wait) and (reset) of processings, which could be considered a problem. Thus, in spite of the execution of a parallel processing, a shortening or reducing of running time does not work out satisfactorily, thereby causing yet another problem.

Therefore, realization of a synchronous processing by means of a combination of general instructions, is widely required in the field of a high speed synchronous processing in a loop parallel computation to reduce the overhead during a synchronous parallel processing or to realize a high speed synchronous processing. Thus, high speed data processing by means of an execution of parallel computation is achieved utilizing a combination of general instructions.

SUMMARY OF THE INVENTION

It is an object of the present invention to provide high speed synchronous processing system for executing a loop parallel processing programs by a plurality of computers.

In accordance with a feature of the present invention, there is provided a data processing system for executing a parallel processing of programs by a plurality of computers, which includes a plurality of parallel processing execution units for dividing a predetermined processing into a plurality of processings; and a plurality of computers for executing a parallel processing of the parallel processing execution unit. In addition, a plurality of wait-until procedure units are provided for synchronization therewith between the plurality of computers in the case of executing a parallel processing. In the invention, one computer assigns a value to a synchronous variable in the course of synchronous processing between processors, to vary the value of said synchronous variable regularly, and the other computer is adapted to wait to operate by a wait-until procedure until a value of a synchronous variable surpasses a predetermined value thereby reducing the overhead time of the synchronous processing.

BRIEF DESCRIPTION OF THE DRAWINGS

FIG. 1(A) is a diagram of a consecutive sequence execution of an original program;

FIG. 1(B) is a diagram of a parallel processing execution image;

FIG. 1(C) is a diagram of a parallel processing including a synchronous processing procedure, respectively;

PREFERRED EMBODIMENTS OF THE INVENTION

Figure 2:
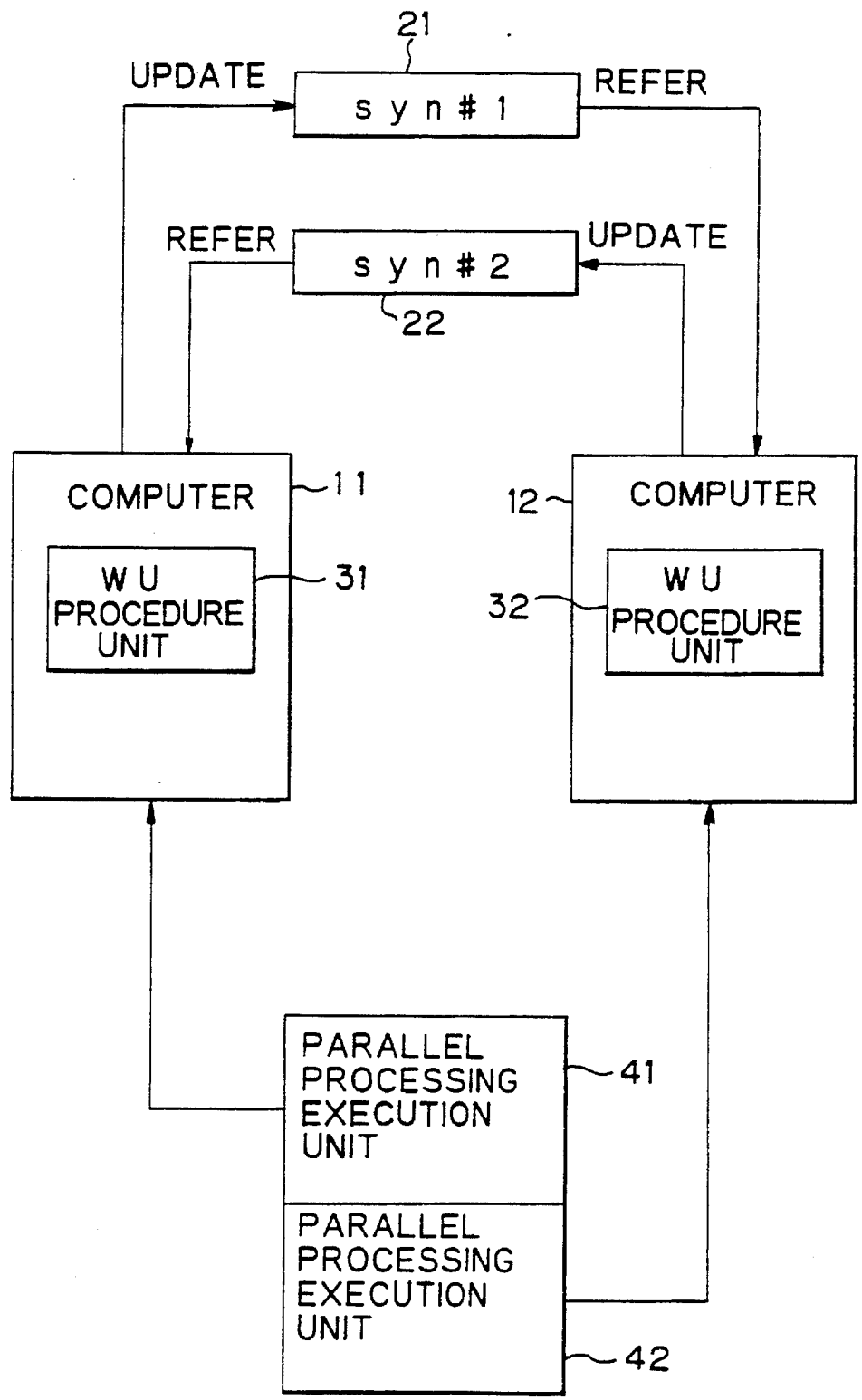
FIG. 2 is a schematic view showing a function of the present invention.

An embodiment of the present invention will be described in detail, first, with reference to a conventional parallel processing necessary for synchronous processing.

FIG. 1(A) is a view showing a consecutive sequence execution of an original program, FIG. 1(B) is a diagram showing a parallel processing execution image, and FIG. 1(C) is a diagram showing a parallel processing execution image-1 in each conventional form.

When a program or loop is parallel-executed by a plurality of computers, each iteration of the loop is executed by a respective computer. In this case, an operation synchronous between computers will often not lead to a true or correct execution result.

For example, suppose a case where a parallel processing of a DO loop described by the FORTRAN programming language is executed. In general, when a parallel processing of a general purpose program is executed, a parallel processing of a loop can be easily executed.

A parallel (processing) execution image of an original program for a serial execution as shown in FIG. 1(A) is represented as shown in FIG. 1(B). The parallel execution image is as follows. That is, each iteration of a loop is executed by every execution unit in the parallel processing, and thus, in FIG. 1(B) a processing thereof is parallel-executed by two computers. For this reason, utilizing a parity of loop parameters, the image is divided into procedures shown in FIG. 1(B) by a cyclic distribution mode.

When a parallel processing of a procedure in FIG. 1(B) is executed, before an assignment statement assigned into A(I+1) at I=1 in a procedure for a first computer, computer-1 is executed, if a reference to A(I) at I=2 in a procedure located in a second computer, computer-2 is made, then an execution result obtained is different from that of a sequential execution program.

Thus, as shown in FIG. 1(C), procedures to effect a synchronous processing (e.g., post, wait procedures) are provided between each execution image, to warrant or ensure a proper execution result.

Syn #1 and syn #2 are variables for use in a synchronous processing. That is these two, synchronous variables take or may be assigned one of three kinds of values, "posted", "waiting" and "cleared". (Post), (wait) and (reset) which are different than the variable values "posted", "waiting" and "cleared", denote procedures for utilizing the synchronous variables to effect a synchronous processing. (Wait) denotes a procedure that, if a value of a synchronous variable given as an argument is not "posted", the value is changed to "waiting", and then the continuation of processing is kept inactive or suspended until the value is changed to "posted". (Post) denotes a procedure which changes or reduces the value of a synchronous variable of an argument to "posted", and therefore, the execution of the inactive procedure is restarted. (Reset) denotes a procedure that, when the value of a synchronous variable is equal to "posted", the value is changed to "cleared".

When the procedures in FIG. 1(C) are parallel-executed, each procedure of (post), (wait) and (reset) is executed during each iteration of a loop, and the operation of synchronization is carried out at a synchronization point (at a time of or during the (wait) procedure).

In a conventional method, the synchronous variables syn #1 and syn #2 are required to be shared with the two computers. From this, conversely, the two computers are able to effect a reference operation and a change operation at the same time on the two synchronous variables. In this case when the variables can be simultaneously operated on by both computers, the relevant synchronous variables are destructible or alterable and as a result, a right or correct processing is impossible.

Therefore, it is necessary to carry out indivisibly the processings in each computer such as a reference of a synchronous variable, a pause instruction of a procedure and a restart of the procedure. For this reason, a special hardware instruction for synchronous processing (for example, a time-sharing instruction) is utilized.

Nevertheless, since it is a characteristic item that this kind of instruction has a longer run duration than a general instruction, frequent overhead occurs due to a great deal of (post), (wait) and (reset) processings for each iteration. Thus, it is also a problem that, in spite of an execution of a parallel processing, the running or execution time is not shortened satisfactorily.

Therefore, realization of a synchronous processing by means of a combination of general instructions, is widely required or desired in the field of a high speed synchronous processing in a loop parallel computation to reduce the overhead during a synchronous processing and to realize a high speed synchronous processing. Thus, a high speed data processing by means of an execution of parallel may be achieved using the combination of general instructions.

FIG. 2 is a schematic view showing a function of the present invention.

In FIG. 2, reference numerals 11 and 12 denote first and second computers, respectively, 21 and 22 synchronous variables #1 and #2, respectively, 31 and 32 wait-until (abbreviated by wu) procedure units and 41 and 42 parallel execution units.

A plurality of computers 11 and 12 perform respective parallel processing execution units 41 and 42. That is, a predetermined processing is divided into a plurality of parallel processing execution units 41 and 42, and parallel processing is executed by the plurality of computers 11 and 12.

Parallel processing execution units 41 and 42 denote or perform each iteration of a loop such as a DO loop. In FIG. 2, a set of parallel processing execution units performed by a first computer 11 is denoted by a parallel processing execution unit 41, as well as a parallel processing execution unit 42.

A plurality of synchronous variables 21 and 22 (syn #1 and syn #2) do not denote the above-described three kinds of values, but describe an iterative state of a loop performed in each computer 11 and 12, that is, an iterative state of parallel processing execution units 41 and 42 (iterative order number). A synchronous variable 21 responsive to a computer 11 can be updated by a computer 11 only, and the computer 11 is only allowed to effect reference or refer to a synchronous variable 22.

The wu procedure units 31 and 32 perform a wu (wait-until) processing and thereby are synchronized between the self of first computer 11 and the other or second computer 12, respectively. That is, the wu procedure unit 31 compares a state of iteration in the self or first computer 11 (equal to syn #1) with a synchronous variable 22 (syn #2) denoting a state of iteration in the other or second computer 12, to wait for an execution of the parallel processing execution unit 41. The wu procedure unit 31 waits until the relationship between the synchronous variables 21 and 22 become a predetermined value, as well as the wu procedure unit 32.

The first computer 11 updates a synchronous variable 21 to represent the state of its iteration in an execution of the parallel processing execution unit 41. Also, a synchronous variable 22 is updated by the computer 12 in the execution of the parallel processing extension unit 42.

The wu procedure unit 31, called or initiated from a parallel processing execution unit 41, compares a state of iteration in the self or first computer 11 with a synchronous variable 22 (syn #2) of the other or second computer 12, to wait until the relationship between them becomes a predetermined value, as well as the wu procedure unit 32.

For example, it is supposed that the wu Procedure unit 31 waits for a processing until $$\text{syn \#2}-1>\text{syn \#1},$$

and then, when this relation holds or occurs, the following or later processing will be performed. On the other hand, suppose that the wu procedure unit 32 waits for a processing until $$\text{syn \#1}>\text{syn \#2}$$

and then, when the relation holds, the following or later processing will be performed. The following execution of one iteration is started in the second computer 12 only when the execution of one iteration of a loop in the first computer 11 has been terminated. And then, an execution of the following iteration is started in the first computer 11, only when the execution of one iteration of a loop in the second computer 12 has terminated.

From the above, without utilizing a special hardware instruction such as (post), (wait), (reset) or the like, the synchronous operation between the first and second computers can be carried out more efficiently by using only a convenient general instruction.

Figure 3:
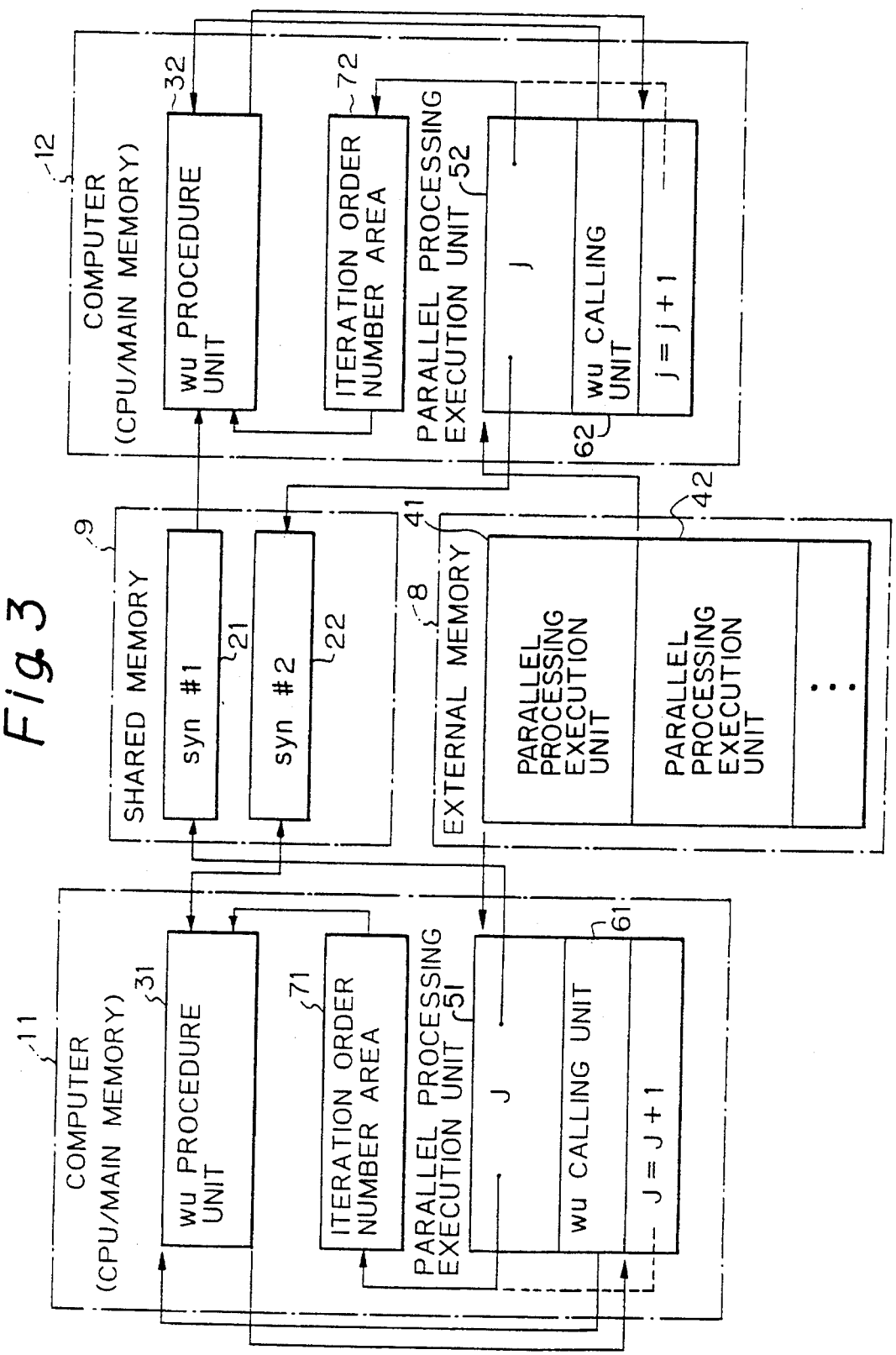
FIG. 3 is a schematic block diagram showing an embodiment of the present invention.

FIG. 3 is a schematic block diagram showing an embodiment of the present invention.

In FIG. 3, reference numerals 51 and 52 denote loaded parallel processing execution units, 71 and 72 denote iteration order number areas, 8 an external memory such as a direct access storage device and 9 a shared memory.

The embodiment in FIG. 3 illustrates a case where each of the two computers 11 and 12 can execute a parallel processing in synchronization with an even and an odd iteration in a DO loop.

Each of the computers 11 and 12 includes a central processing unit (CPU) and a main memory. Parallel processing execution units (that is, load modules) 41 and 42 are loaded into the main memory of computers 11 and 12 from an external memory 8 to be parallel processing execution units in a running state 51 and 52, respectively. Each wu procedure unit 31 and 32 is provided in a main memory of a respective computer 11 and 12. A predetermined area of the main memory is utilized to store each iteration order number (J, j) of parallel processing execution units 51 and 52 for each iteration in the order number areas 71 and 72.

The computers 11 and 12 include a shared memory 9. A predetermined area of the shared memory 9 is utilized as an area for storing synchronous variables 21 and 22.

Prior to calling the wu procedure unit 31, the loaded parallel processing execution unit 51 sets or transfers the iteration order number J to an iteration order number area 71. Iteration order number area 71 uses the number J, and updates a synchronous variable 21 of the first computer 11 in the shared memory 9. After calling the wu procedure unit 31, and after a return from or completion of the procedure performed in wu procedure unit 31, the number J is counted up or incremented by +1 in preparation for the following iteration.

A wu calling unit 61 of the parallel processing execution unit 51 calls the wu procedure unit 31 and delivers a predetermined relational expression to it, to request a wu processing.

The wu procedure unit 31 refers to the iteration order number area 71 of the self or first computer 11 to recognize or obtain an iteration order number J. Therefore, the iteration order number area 71 is a means for delivering the number J from the parallel processing execution unit 51 to the wu procedure unit 31. The wu procedure unit 31 then refers to a synchronous variable 22 (syn #2) of another or second computer 12 in the shared memory 9. Then, since the wu procedure unit 31 can only refer to but not update a synchronous variable 22, the synchronous variable 22 (syn #2) is not destroyed or altered and can be referred thereto regardless of its updating by the second computer 12.

The wu procedure unit 31 refers to the number J and variable syn #2 by using a relational expression delivered from the parallel processing execution unit 51 and waits until the relational expression is satisfied. If the relational expression is established or satisfied, the wu procedure unit 31 returns to the parallel processing execution unit 51 (reset a control). Therefore, since the synchronous variable 22 of another computer 12 is a predetermined value at a time of reversion of the wu procedure unit 31, the synchronization is carried out correctly.

A wu calling unit 62 and a wu procedure unit 32 is operated in the same manner as the wu calling unit 61 and the wu procedure unit 31.

Figure 4:
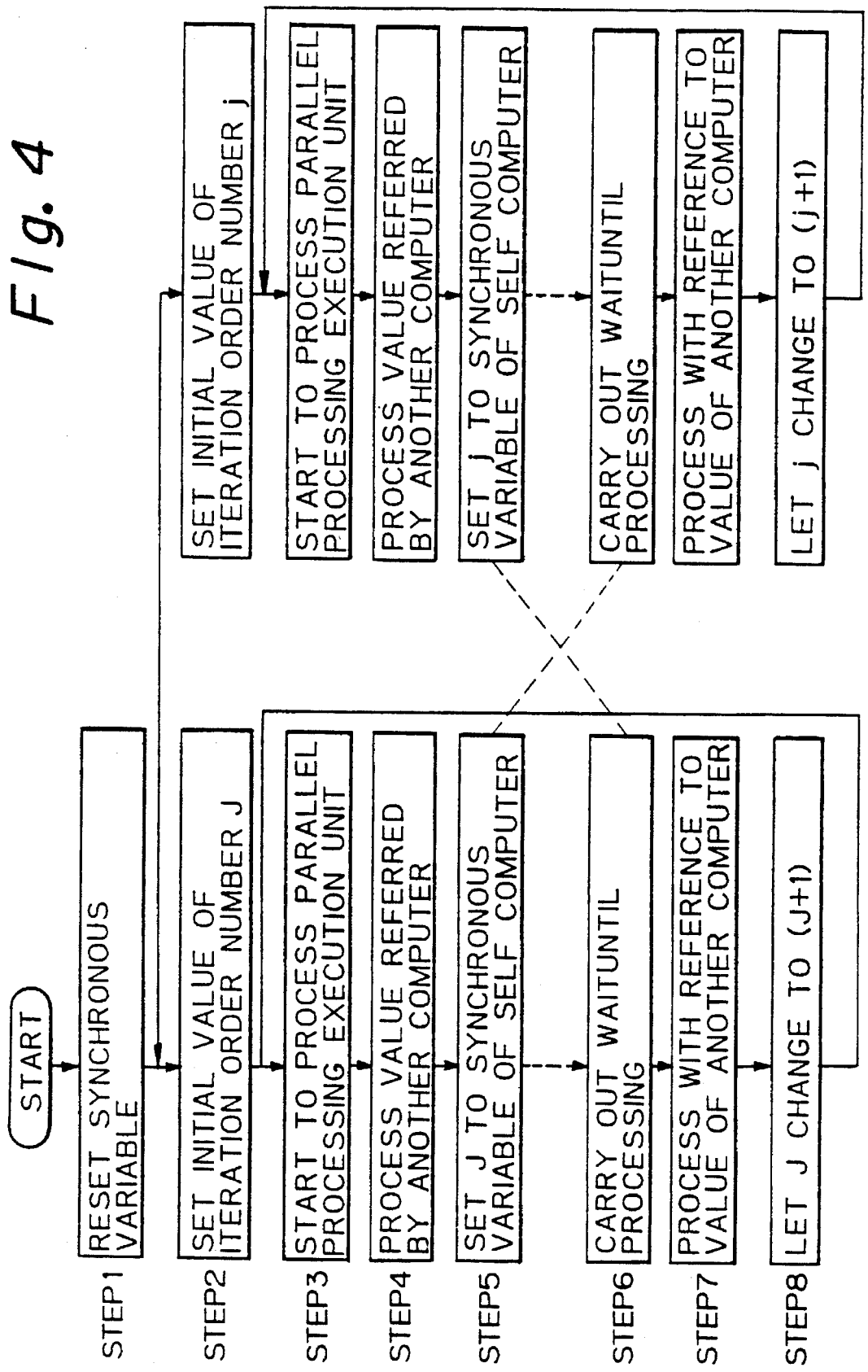
FIG. 4 illustrates a flow chart of a parallel processing execution.

FIG. 4 illustrates a flow chart of a parallel processing execution.

Step 1 A host program for executing parallel processing execution units 41 and 42 resets synchronous variables 21 and 22 in order to start a parallel processing execution (make them "0"). Thereafter, the parallel processing execution units 41 and 42 are loaded with computers 11 and 12, respectively, to carry out a parallel processing execution.

Step 2 A parallel processing execution unit 51 in a computer 11 sets "1" as an initial value of the iteration order number in the first computer 11 J to an iteration order number area 71.

A parallel processing execution unit 52 in a computer 12 sets "1" as an initial value of the iteration order number j to an iteration order number area 72.

Since a processing performed by the parallel processing execution unit 51 is the same as that performed by the parallel processing execution unit 52 described in step 3 through step 8 except the correspondence J to j and (J+1) to (j+1), the description will be limited to the processing executed in the first computer 11 for brevity hereinafter.

Step 3 The parallel processing execution unit 51 starts to perform a J-th iteration processing.

Step 4 The parallel processing execution unit 51 carries out a processing of a value referred to from another computer 12, that is, the parallel processing execution unit 52.

Step 5 The parallel processing execution unit 51 set a value "J" stored in the iteration order number area 71 to the synchronous variable 21 in the first computer 11.

Step 6 Then, after a definite or specified processing, a wu calling unit 61 calls the wu procedure unit 31. The wu procedure unit 31 carries out a wu processing to be in synchronization with another or second computer 12, that is, the parallel processing execution unit 52.

Step 7 After synchronization, the parallel processing execution unit 51 carries out a processing which refers to a value processed by another computer 12, that is, the parallel processing execution unit 52.

Step 8 In preparation an execution during a following iteration, the parallel processing execution unit 51 counts or increments the iteration order number J by (+1) and transfers the incremented iteration number to an iteration order number area 71.

Thereafter, Step 3 to Step 8 are processed iteratively a predetermined number of times and the parallel processing execution terminates.

In the above, since the processing in Step 7 is performed after a synchronous processing in Step 6, a processing using a right or correct value is possible. On the contrary, since a processing in step 4 necessary for an after-synchronization processing is performed before the synchronous processing in Step 6, a processing in Step 7 can be performed immediately after synchronization.

Since a processing in Step 5 is carried out immediately after a processing in Step 4, if another computer system is in a state of a processing in Step 6, it can be synchronized therewith immediately and each synchronous variable can always be set in an updating state so as to be ready for a synchronous processing.

Figure 5:
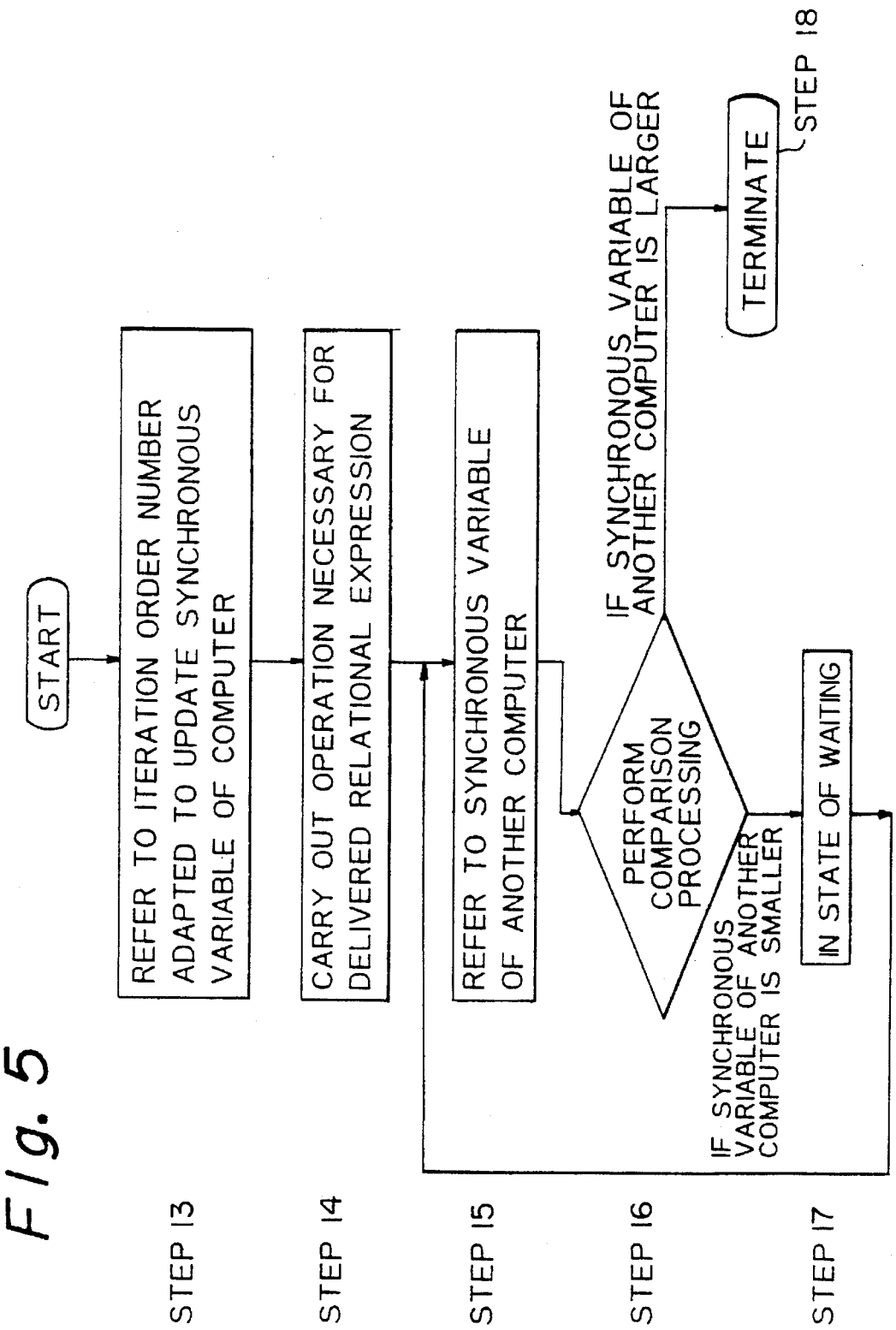
FIG. 5 is a flow chart for a wait-until processing of a synchronous processing.

FIG. 5 is a flow chart for a wu processing (of a synchronous processing).

The following processing can be carried out by a wu procedure unit 31 or 32.

Step 13 An iteration order number J or j which is utilized for an updating of synchronous variables 21 or 22 in computer 11 or 12, respectively, is recognized with reference to its iteration order number area 71 or 72, respectively.

Step 14 Based on a relational expression delivered from a wu calling unit 61 or 62 as an argument, an operation using the number J or j is respectively carried out or performed.

Step 15 A synchronous variable 22 or 21 (syn #2 or syn #1) in computer 12 or 11, respectively is recognized with reference to a shared memory 9.

Step 16 Based on the above-described relational expression, a synchronous variable syn #2 or syn #1 and an operation result of a processing in Step 14 are compared.

Step 17 If a synchronous variable in the other computer e.g., second computer 12 if the processing is performed in the first computer 11 is smaller than the above-described operational result, it is in a state of "wait" and the Steps 15 to 17 in the processing are repeated.

Step 18 If the synchronous variable in the other computer is larger than the above-described operational result, the processing in Step 16 terminates and the control process is returned to the parallel processing execution unit 51 or 52.

Figure 6:
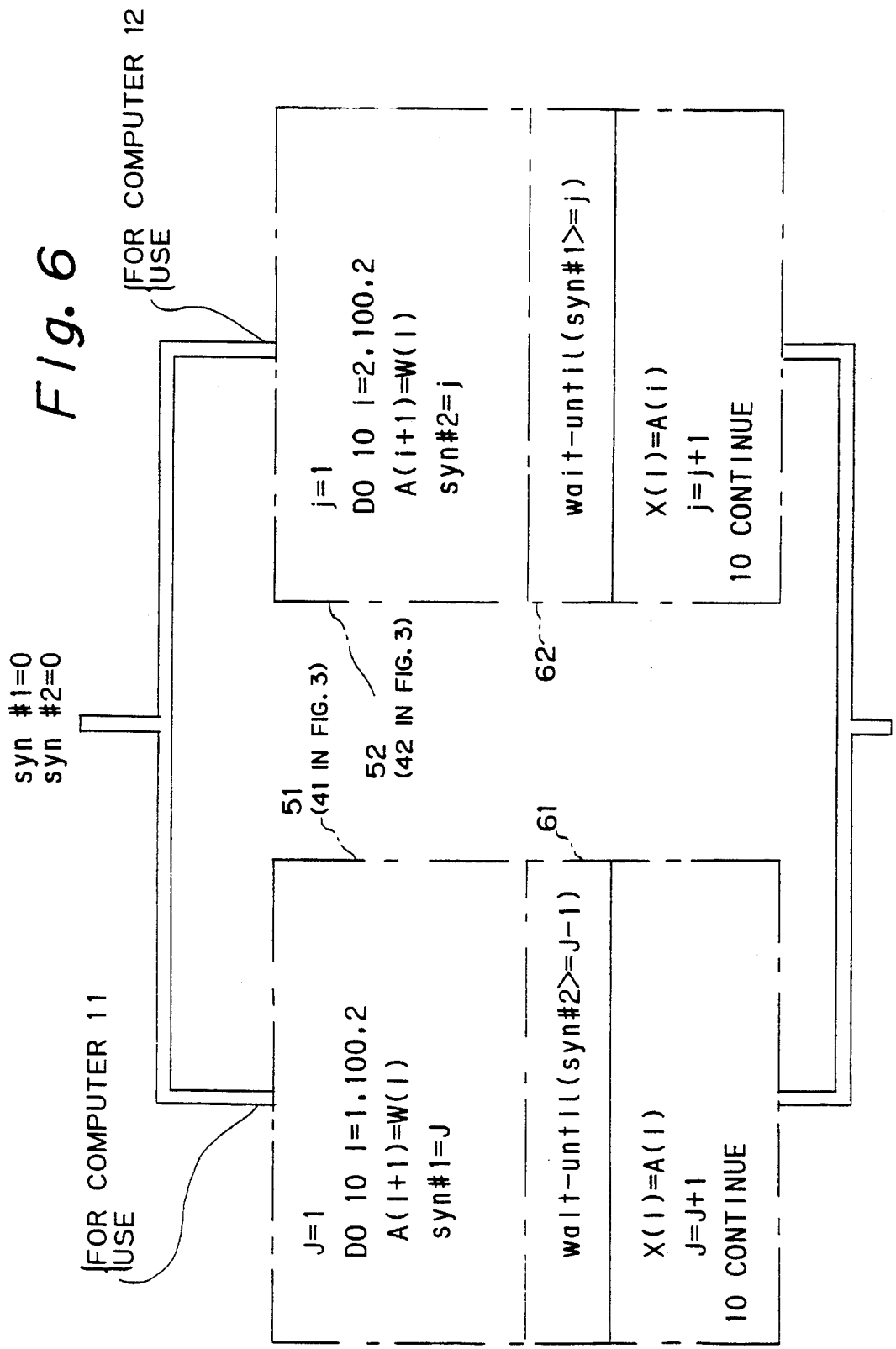
FIG. 6 is a view showing an embodiment of a synchronous processing program by a wait-until method in accordance with the present invention.

FIG. 6 is a diagram showing an embodiment of a synchronous processing program by a wait-until method. An example as illustrated in FIG. 1 is realized by the present embodiment.

"syn #1=O" and "syn #2=O" correspond to Step 1 in FIG. 4 and is executed by a host program.

In the parallel processing execution unit 51 in FIG. 3, an initial value of a synchronous order number J is set to "1", by an expression "J=1". This value is stored in the iteration order number area 71.

By the expression

"DO 10 I=1,100, 2", an odd iteration of the DO loop corresponds to a parallel processing execution unit 51. On the other hand, by the expression "DO 10 i=2,100, 2", an even iteration corresponds to a parallel processing execution unit 52. These correspond to Step 3 in the processing of FIG. 4.

An assigned result of the expression

"A(I+1)=W(I)"

is referred to in the expression "X(i)=A(i)" in another parallel processing execution unit 52, which corresponds to Step 4 in the processing of FIG. 4.

By the expression "syn #1=J", a value i stored in the iteration order number area 71 is set to a synchronous variable 21 in a shared memory 9, which corresponds to Step 5 in the processing of FIG. 4.

"Wait-until" is a wu calling unit 61 and is delivered as a relational expression which satisfies "( syn #2>J−1) ".

After the called wu procedure unit 31 is synchronized with another computer 12 by the processing by wu processing, it returns to "X(I)=A(I)", immediately after the wu calling unit 61. The expression "X(I)=A(I)" corresponds to Step 6 in the processing of FIG. 4.

The expression "X(I)=A(I)" refers to a result of the expression "A(i+1) W(i)" in another parallel processing execution unit 52. That is, it corresponds to Step 7 in the processing of FIG. 4. At this time, since synchronization has already been accomplished therewith, A(i+1) having a right or correct value can be referred thereto.

The expression "J=J+1" corresponds to Step 8 in the processing of FIG. 4.

Also, the same treatment can be carried out with the parallel processing execution unit 52 in FIG. 3.

Next, a satisfied relational expression in the wu procedure will be described. A relational expression to be satisfied in the wu procedure unit 31 and 32 is determined by a distance x (a distance between a self or first computer 11 and another or second computer 12. The distance x is defined as follows. That is, the computers in which an execution of a 1-st iteration, a second iteration, . . . , a n-th iteration of the loop is allocated are referred to as the 1-st computer, the 2-nd computer, . . . the n-th computer, respectively.

A distance x between the i-th computer and the j-th computer as for the j-th computer is defined as "j - i".

In an embodiment of the present invention, as for the first computer 11, $x = 1$ (the 1-st iteration)  $\quad 2$ (the 2-nd = −1 iteration)

as for the second computer 12, $x = 2$ (the 2-nd iteration)  $\quad 1$ (the 1-st = 1 iteration)

If the distance x is negative, that is, the wu procedure unit 31 is devised or designed to request the iteration order number (J−1). If the distance is positive, that is, the wu procedure unit 32 is devised not to carry out the processing. That is, the iteration order number j is used or left intact or unchanged.

From the point of view of the wu procedure unit 31, if the synchronous variable syn #2 is more than (J−1), since a prior iteration of the loop "A(i+1)=W(i)" terminates, it is said that a synchronization has been carried out or achieved. From the point of view of the wu procedure unit 32, if the synchronous variable syn #1 is more than j (over), since the said processing of a prior iteration of the loop terminates in the same way, it is synchronized therewith already.

An improved method of the present invention is outlined as follows.

In a synchronous processing where we consider a parallel processing system in which each iteration of a loop is performed by different computers, there is provided a feature that, once a wait state is released, a wait state is not again present until its portion is passed or expired. From this feature, every time a loop is iterated by one computer, a variable is ready which increases the value regularly, and the other computer waits until the value of the variable satisfies a predetermined value (FIG. 6). A feature or improvement of the present invention resides in the point that both the side for updating a value and the side for referring should utilize a general hardware instruction. As a result, with reference to the "post", "wait", and "reset" procedures for which a special hardware instruction for synchronous processing is utilized, a high speed synchronous processing can be performed.

Next, another embodiment of the present invention will be described.

Loop slicing is performed by a process such that each iteration of a loop is allocated to different computers comprising n virtual processors. Virtual processors to which the 1-st iteration, the 2-nd iteration, ..., the n-th iteration are allocated are referred to as the first processor, the second processor, ... the n-th processor, respectively. "A distance between processors" between the i-th processor and the j-th processor is defined as (j−i). First, the i-th iteration, next, (i+n)-th iteration, ... are allocated in the i-th processor. "Time distance" between (i+K×n)-th iteration and (j+L×n)-th iteration (L>K, i<n, j<n) is defined as (L − K).

It is necessary for a data dependent relationship between all iterations of a loop (referred to as Inter-Iterational Dependency: IID) to carry out a synchronous processing. In place of the use of "post" and "wait" procedures every IID, an assignment to a synchronous variable such as syn #1 or syn #2 used in FIG. 6 and an "wait-until" procedure are utilized. At a location using "post", an iteration order number of a loop is assigned to a synchronous variable. Supposing that a time distance of IID is D, the waiting side (virtual processor) waits by a wait-until procedure, until the value of a synchronous variable is equal to or larger than the "iteration order number+D" in a virtual computer waiting. Nevertheless, if the distance between processors is negative, a condition that is equal to or larger than the iteration order number +D−1 can be used.

Since the first embodiment in FIG. 6 denotes when the time distance D=0, the wait-until condition is "syn #1>j and syn #2>J−1".

The wait-until procedure is a simple procedure such that a given conditional expression is evaluated if a value is false, and an evaluation of the conditional expression is repeated. If a value is true, the wait-until procedure terminates, an overhead or unnecessary processing is considerably reduced.

When a general-purpose program is parallel-executed, a parallel processing most easily carried out is a parallel execution of each iteration of the loop. Then, an inter-iterational dependency between each iteration of the loop exists, and a synchronous processing is requisite. In this case, use of the synchronous processing system of the present invention reduces overhead and improvement of an execution performance of a parallel program is possible.

We claim:

1. A data processing system for executing a parallel processing of programs comprising:

a plurality of parallel processing execution units;

a plurality of computers, each computer connected to a corresponding parallel processing execution unit, wherein the plurality of computers have a shared memory;

a plurality of wait-until procedure units, each wait-until procedure unit. connected to a corresponding computer, being synchronized with said plurality of computers, wherein a first of the plurality of computers assigns a first value to a first synchronous variable from the shared memory during a synchronous parallel processing between the plurality of computers, the first value of said first synchronous variable is updated by using only a general instruction; and wherein a second of the plurality of computers suspends operation using a wait-until procedure performed by one of the wait-until procedure units until a first value of a second synchronous variable from the shared memory surpasses a predetermined value.

2. The system according to claim 1, wherein each iteration of a loop is assigned to the plurality of computers.

3. The system according to claim 1, wherein said plurality of computers comprise virtual processors being assigned a 1-st iteration through an m-th iteration; and wherein said virtual processors comprise an i-th processor and a j-th processor, and distance between processors between the i-th processor and the j-th processor is defined to be (j-1) and a time distance between an (i+K×n)-th iteration and a (j+L×n)-th iteration is defined to be (L-K).

4. The system according to claim 1, wherein said system further comprises a plurality of synchronous variables, each corresponding to one of said plurality of computers, for showing a state of interaction in each of the one of said plurality of computers; and wherein said plurality of wait-until procedure units wait until a relationship between said state of interaction in the first of said plurality of computers and said plurality of synchronous variables in the second of the plurality of computers becomes the predetermined value to provide synchronous parallel processing.

5. The system according to claim 4, wherein said plurality of parallel processing execution units include a wait-until calling unit, and said plurality of wait until procedure units are invoked by said wait-until calling unit to provide synchronous parallel processing.

6. The system according to claim 4, wherein each of said plurality of synchronous variables is updated only by said first of said plurality of computers corresponding to each of said plurality of synchronous variables, and each of said plurality of synchronous variables only being referred to by the second of said plurality of computers not corresponding to each of said plurality of synchronous variables.

7. A data processing system for executing a parallel processing of programs, comprising:

a memory including a plurality of parallel processing execution units; and a plurality of computing devices, each computing device receiving a corresponding parallel processing execution unit from the memory, and executing the corresponding parallel processing execution unit, wherein each computing device comprises a wait-until procedure unit which carries out a wait-until processing in synchronization with the other computing devices to perform parallel processing, wherein a first computing device assigns a first value to a first synchronous variable during synchronous parallel processing between computing devices, the first value of said first synchronous variable is updated by using only a general instruction, and wherein a second computing device of the computing devices suspends operation using a wait-until procedure performed by one of the wait-until procedure units until a first value of a second synchronous variable surpasses a predetermined value.

8. A data processing system for executing a parallel processing of programs comprising:

a plurality of parallel processing execution units;

a plurality of virtual computers;

a shared memory having synchronous variables corresponding to each of said plurality of virtual computers;

a plurality of wait-until procedure units for effecting synchronous processing between a pair of said plurality of virtual computers when executing the parallel processing, each of said wait-until procedure units connected to a corresponding virtual computer, wherein a first of the plurality of virtual computers assigns a value to a first synchronous variable between the plurality of virtual computers, the value of said first synchronous variable being updated by using a general instruction; and wherein a second of the plurality of computers suspends an operation by a wait-until procedure performed by one of the wait until procedure units until a value of said first synchronous variable from the shared memory surpasses a predetermined value.

9. A data processing system for executing iterative processing programs consisting of a plurality of parallel processing execution units comprising:

a plurality of computers and a shared memory, said shared memory having synchronous variables corresponding to each of said plurality of computers, each of said plurality of computers comprising a wait-until procedure unit and an iteration order number area wherein each of said computer updates the synchronous variables and said iteration order number area at a predetermined same time or different time during execution of each iteration, and said wait-until procedure unit prevents the computer from executing said plurality of parallel processing execution units until the values of synchronous variables for the other computers and the iteration order number area satisfy a predetermined condition.

* * * * *

UNITED STATES PATENT AND TRADEMARK OFFICE
CERTIFICATE OF CORRECTION

PATENT NO. : 5,586,320
DATED : December 17, 1996
INVENTOR(S) : Koh-Ichiro HOTTA, et al.

It is certified that error appears in the above-indentified patent and that said Letters Patent is hereby corrected as shown below:

Col. 10, line 31, delete [.].

Col. 12, line 16, change "wait until" to --wait-until--.

Col. 12, line 28, change "computer" to --computers--.

Signed and Sealed this

Twenty-fifth Day of March, 1997

*Attest:*

BRUCE LEHMAN

*Attesting Officer*       *Commissioner of Patents and Trademarks*